United States Patent
El-Maleh et al.

(10) Patent No.: US 9,351,013 B2
(45) Date of Patent: May 24, 2016

(54) SELECTIVE AND/OR SCALABLE COMPLEXITY CONTROL FOR VIDEO CODECS

(75) Inventors: Khaled El-Maleh, San Diego, CA (US); Hau Hwang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 2376 days.

(21) Appl. No.: 10/713,240

(22) Filed: Nov. 13, 2003

(65) Prior Publication Data

US 2005/0105615 A1 May 19, 2005

(51) Int. Cl.
*H04N 7/12* (2006.01)
*H04N 19/523* (2014.01)
*H04N 19/139* (2014.01)
*H04N 19/176* (2014.01)
*H04N 19/107* (2014.01)
*H04N 19/14* (2014.01)
*H04N 19/156* (2014.01)

(52) U.S. Cl.
CPC .......... *H04N 19/523* (2014.11); *H04N 19/107* (2014.11); *H04N 19/139* (2014.11); *H04N 19/14* (2014.11); *H04N 19/156* (2014.11); *H04N 19/176* (2014.11)

(58) Field of Classification Search
CPC .......... H04N 19/003; H04N 19/00151; H04N 19/139; H04N 19/0063; H04N 19/523; H04N 19/0066
USPC ............. 375/240.12, 240.24, 240.03, 240.27, 375/240.16, 240.15, 240.25
See application file for complete search history.

(56) References Cited

U.S. PATENT DOCUMENTS

| 5,144,426 | A | * | 9/1992 | Tanaka ................. | H04N 19/159 375/240.13 |
| 5,682,204 | A |   | 10/1997 | Uz et al. ................... | H04N 1/41 |
| 5,724,100 | A | * | 3/1998 | Kuchibhotla .......... | G11B 27/28 348/700 |
| 5,731,835 | A | * | 3/1998 | Kuchibholta ........ | H04N 19/503 348/390.1 |
| 5,815,670 | A | * | 9/1998 | Iverson et al. ................. | 709/247 |
| 5,963,673 | A | * | 10/1999 | Kodama ............... | H04N 19/577 375/E7.121 |
| 5,987,180 | A | * | 11/1999 | Reitmeier ............. | G06T 7/2026 348/E5.003 |
| 5,990,957 | A | * | 11/1999 | Ryoo ................... | H04N 19/176 375/240.03 |
| 6,014,181 | A | * | 1/2000 | Sun ............................... | 348/699 |

(Continued)

FOREIGN PATENT DOCUMENTS

WO PCT/US2003/019399 6/2003 ............... H04N 7/26

OTHER PUBLICATIONS

Osako et al.; *A Dynamic Computation Resource Scalable Algorithm for Software Video CODEC*; NTG Fachberichte, VDE Verlag, Berlin, vol. 143, Sep. 10, 1997; pp. 515-518.

(Continued)

*Primary Examiner* — Tung Vo
(74) *Attorney, Agent, or Firm* — Brent Boyd (57) ABSTRACT

Methods and apparatus are presented herein to perform selective and/or scalable complexity control of the video codec, so that the amount of processing resources consumed by a video codec may be increased or reduced. Based on the configurable thresholds set within complexity control algorithms, the nonpredictive and the predictive coding sections of the video codec may be selectively implemented. The configurable thresholds are used to determine whether a desired amount of spatial information, such as texture information or motion information, is present within a video frame.

60 Claims, 5 Drawing Sheets

(56) References Cited

U.S. PATENT DOCUMENTS

| | | | | |
|---|---|---|---|---|
| 6,037,987 A * | 3/2000 | Sethuraman | ......... | H04N 19/176 375/240.03 |
| 6,091,460 A * | 7/2000 | Hatano | ................ | H04N 19/105 348/699 |
| 6,108,449 A * | 8/2000 | Sekiguchi | ............ | H04N 19/105 375/E7.081 |
| 6,122,400 A * | 9/2000 | Reitmeier | .............. | G06T 7/2026 348/E5.003 |
| 6,125,144 A | 9/2000 | Matsumura et al. | | |
| 6,307,886 B1 * | 10/2001 | Westermann | .......... | H04N 19/51 375/240.09 |
| 6,414,992 B1 | 7/2002 | Sriram et al. | | |
| 6,415,055 B1 * | 7/2002 | Kato | .............................. | 382/236 |
| 6,421,386 B1 * | 7/2002 | Chung | ................... | H04N 19/00 375/240.24 |
| 6,445,312 B1 | 9/2002 | Nguyen | .................. | H03M 7/00 |
| 6,493,392 B1 * | 12/2002 | ***Moon | .............. | H04N 19/29 375/240.13 |
| 6,567,469 B1 | 5/2003 | Rackett | .................... | H04N 7/12 |
| 6,591,015 B1 | 7/2003 | Yasunari et al. | ......... | H06K 9/36 |
| 6,618,507 B1 * | 9/2003 | Divakaran et al. | ............ | 382/236 |
| 6,697,430 B1 * | 2/2004 | Yasunari et al. | ........... | 375/240.13 |
| 6,813,379 B2 * | 11/2004 | Kawada et al. | ................ | 382/173 |
| 6,831,947 B2 * | 12/2004 | Ribas Corbera | ..... | H04N 19/176 348/404.1 |
| 6,907,072 B2 * | 6/2005 | Kawakatsu et al. | ...... | 375/240.13 |
| 7,177,359 B2 * | 2/2007 | Song et al. | ............... | 375/240.16 |
| 7,280,597 B2 * | 10/2007 | Zhang et al. | ............. | 375/240.16 |
| 7,418,147 B2 * | 8/2008 | Kamaci | ................ | H04N 19/176 375/E7.121 |
| 2002/0196854 A1 * | 12/2002 | Kim | .......................... | 375/240.17 |
| 2003/0156644 A1 | 8/2003 | Song et al. | ................ | H04N 7/12 |
| 2004/0234144 A1 * | 11/2004 | Sugimoto | ............. | H04N 19/176 382/239 |
| 2004/0264571 A1 * | 12/2004 | Zhang | .................. | H04N 19/197 375/240.16 |
| 2013/0202036 A1 * | 8/2013 | Nagori | ............. | H04N 19/00569 375/240.13 |

OTHER PUBLICATIONS

Tan et al.; *Classified Perceptual Coding with Adaptive Quantization*; IEEE Transactions on Circuits and Systems for Video Technology, IEEE Inc. New York, US, vol. 6, No. 4, Aug. 1996, pp. 375-388.

Tourapis et al.; *Highly Efficient Predictive Zonal Algorithms for Fast Block-Matching Motion Estimation*; IEEE Transactions on Circuits and Systems for Video Technology, vol. 12, No. 10, Oct. 2002, pp. 934-947.

International Search Report and Written Opinion—PCT/US2004/038342, International Search Authority—European Patent Office—Oct. 26, 2005.

\* cited by examiner

SELECTIVE AND/OR SCALABLE COMPLEXITY CONTROL FOR VIDEO CODECS

BACKGROUND

1. Field

This invention relates generally to the field of digital image processing, and more specifically, to the field of video encoding and decoding.

2. Background

The transmission of video images over communication channels, either wireless or wired, has become possible with developments that improve the data capacity of communication channels. Moreover, various standards have been established to facilitate the transmission and reception of video images using electronic devices with digital storage media, such as mobile telephones, personal computers, personal digital assistants (PDAs), and other electronic devices. Examples of some video standards that enable the transmission of video images over communication channels are Moving Pictures Expert Group-1 (MPEG-1), MPEG-2, and MPEG-4, International Telecommunications Union (ITU) H.264, which were promulgated by the International Organization for Standardization (ISO).

In order to provide such video services, the original images must be compressed in a manner that will not exceed the data capacity of a communication channel. However, the manner in which the compression is performed should not sacrifice the perceptual quality of images at a receiver.

In order to balance these two competing requirements, many video encoders use a transform coding technique combined with a motion compensation technique to compress the original images. The transform coding technique is used to remove spatial redundancy while the motion compensation technique is used to remove temporal redundancy.

It is widely acknowledged by those of skill in the art that compression of original images using transform coding and motion compensation techniques is computationally intensive. The number of instructions needed to perform the compression, as measured in MIPS (million instructions per second), is substantial and may consume hardware resources that could otherwise be allocated to other applications. Since the compression is often expected to be performed within small, portable electronic devices, hardware resources to perform these compression techniques may be limited. Hence, there is a present need to reduce the MIPS requirements of video encoders without unduly degrading the perceived quality of the video image.

SUMMARY

Methods and apparatus are presented herein to address the above stated needs. In one aspect, a method is presented for categorizing a portion of a video frame, comprising: using texture information in the portion to determine whether the portion comprises at most a predetermined amount of spatial information; and if the texture information indicates that the portion comprises at most the predetermined amount of spatial information, then categorizing the portion as nonpredictive.

In another aspect, a method is presented for categorizing a portion of a video frame, comprising: using texture information in the portion to determine whether the portion comprises at most a predetermined amount of spatial information; if the texture information indicates that the portion comprises at most the predetermined amount of spatial information, then categorizing the portion as nonpredictive; if the texture information indicates that the portion does not comprise at most a predetermined amount of spatial information, then: performing a motion estimation search; using motion information determined during the motion estimation search to determine whether the portion comprises at least a predetermined amount of predictive information; if the motion information indicates that the portion comprises at least the predetermined amount of predictive information, then categorizing the portion as predictive; and if the motion information indicates that the portion does not comprise at least the predetermined amount of predictive information, then categorizing the portion as nonpredictive.

In another aspect, a method is presented for selectively encoding a current macroblock using nonpredictive encoding or predictive encoding, comprising: using texture information of the current macroblock to determine whether to nonpredictively encode the current macroblock; and using motion information of the current macroblock to determine whether to predictively encode the current macroblock.

In another aspect, a method is presented for selectively reducing processing cycles of a video codec, comprising: receiving a configuration signal; and configuring at least one variable within a complexity control algorithm in accordance with the configuration signal, wherein the complexity control algorithm is for selectively increasing the number of nonpredictively encoded portions of a predictive video frame based upon texture information.

In another aspect, apparatus is presented for selectively reducing the processing cycles of a video codec, comprising: a first complexity control element configured to use texture information of a current macroblock to determine whether to nonpredictively encode the current macroblock; and a second complexity control element configured to use motion information of the current macroblock to determine whether to predictively encode the current macroblock.

In another aspect, apparatus is presented for categorizing a portion of a video frame, comprising: at least one memory element; and at least one processing element configured to execute a set of instructions stores in the at least one memory element, the set of instructions for: using texture information in the portion to determine whether the portion comprises at most a predetermined amount of spatial information; if the texture information indicates that the portion comprises at most the predetermined amount of spatial information, then categorizing the portion as nonpredictive; if the texture information indicates that the portion does not comprise at most a predetermined amount of spatial information, then: performing a motion estimation search; using motion information determined during the motion estimation search to determine whether the portion comprises at least a predetermined amount of predictive information; if the motion information indicates that the portion comprises at least the predetermined amount of predictive information, then categorizing the portion as predictive; and if the motion information indicates that the portion does not comprise at least the predetermined amount of predictive information, then categorizing the portion as nonpredictive.

In another aspect, apparatus is presented for selectively encoding a current macroblock using nonpredictive encoding or predictive encoding, comprising: means for using texture information of the current macroblock to determine whether to nonpredictively encode the current macroblock; and means for using motion information of the current macroblock to determine whether to predictively encode the current macroblock.

In another aspect, apparatus is presented for selectively reducing processing cycles of a video codec, comprising: means for receiving a configuration signal; and means for configuring at least one variable within a complexity control algorithm in accordance with the configuration signal, wherein the complexity control algorithm is for selectively increasing the number of nonpredictively encoded portions of a predictive video frame based upon texture information.

In another aspect, apparatus is presented for categorizing a portion of a video frame, comprising means for using texture information in the portion to determine whether the portion comprises at most a predetermined amount of spatial information and categorizing the portion as nonpredictive if the texture information indicates that the portion comprises at most the predetermined amount of spatial information.

DETAILED DESCRIPTION

The newer generation of video compression standards exploits a phenomenon of video images in order to reduce the encoding complexity. Video is merely a series of still images, called frames, which run quickly and successively in time. It may be observed that some frames of video differ spatially from neighboring frames while some frames of video differ both spatially and temporally from neighboring frames. Hence, most video compression standards perform different coding techniques for "intraframes," which are frames that have spatial information, and "interframes," which are frames that have spatial and temporal information. Predictive coding is typically used for frames that contain both spatial and temporal information. For illustrative ease, intraframes will be referred to herein as I-frames and interframes will be referred to herein as P-frames. In order to encode I-frames and P-frames, a typical video codec will work upon macroblocks of an image frame, rather than the image frame in its entirety. Using standard size measurements from the Quarter Common Intermediate Format (QCIF), a block comprises an 8×8 group of pixels and a macroblock comprises a 16×16 group of pixels. A QCIF frame of 176×144 pixels has 99 macroblocks.

Figure 1A:
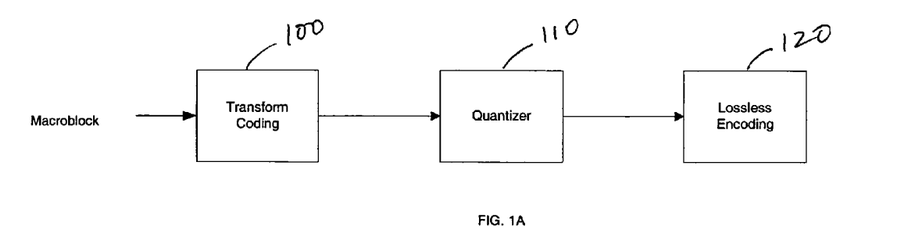
FIGS. 1A & 1B are flowcharts of conventional video compression schemes as used by a video encoder.

FIG. 1A is a flowchart illustrating the coding of I-frame macroblocks. At step 100, the pixels within an I-frame macroblock undergo a transform coding. At step 110, the coefficients of the transform are then quantized. At step 120, the quantized coefficients are then losslessly encoded for transmission. Since the transform coding technique standardized in MPEG-4 is the Discrete Cosine Transform (DCT), the embodiments are described herein using the DCT. However, one of skill in the art would recognize that the embodiments are not limited to DCT, but can be utilized in video encoders using other transform coding techniques. The DCT is frequently chosen as the transform code for video coding standards since a high amount of energy can be packed in a relatively small number of coefficients.

The decoding of I-frame macroblocks involves a reversal of the process in FIG. 1A, in that received information is losslessly decoded, de-quantized, and then transformed using an inverse of the transform used at step 100.

The encoding process for I-frame macroblocks is relatively straightforward and not computationally intensive. Coding I-frames requires a large number of bits, which requires a large amount of storage memory for transmission bandwidth. Hence, this encoding process consumes memory, rather than processor cycles. To encode the entire stream of video according to the method illustrated in FIG. 1A would be inefficient, since the transmission channel would be unable to carry the total number of bits required to convey multiple frames per second. For example, in circuit-switched landline telephone systems, the communication channel is physically limited to 64 kbits/second. However, this bit rate is inadequate for the purpose of synthesizing a video stream with acceptable perceptual quality, as in the instance when a video stream is encoded according to the Common Intermediate Format (CIF) at 15 frames per second.

In contrast to I-frames, P-frames further contain temporal information, which can be used along with spatial information to predictively reduce the number of bits that needs to be stored in memory. In a video recording of low motion activity, the difference in pixels between one frame and the next is small. Since there is little or no motion, it is possible to use information about a previous and/or future frame to predict what the current frame will show. Rather than encode and transmit all the bits of the current frame, a prediction of what the current frame may contain is encoded and transmitted, which reduces the number of bits that need to be stored or transmitted. However, the encoding of P-frames is computationally expensive due to the number of estimation calculations that are needed to calculate the residual frame.

Figure 1B:
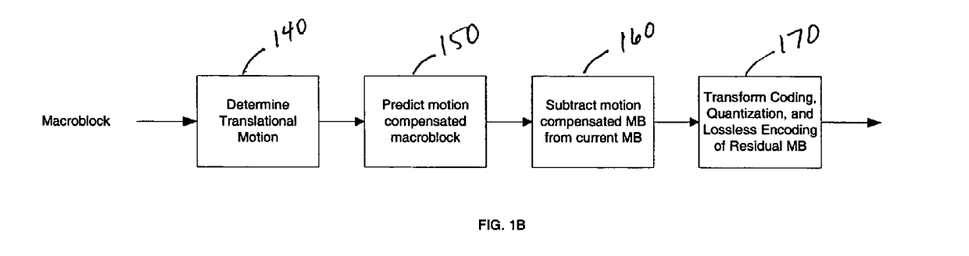

FIG. 1B is a flowchart illustrating the encoding of P-frame macroblocks. At step 140, the translational motion between blocks of pixels within a P-frame is determined using motion estimation techniques. The motion is usually modeled as a motion vector. Groups of blocks, i.e., macroblocks, may be compared in order to determine a plurality of motion vectors for each P-frame. Note that the search for motion vectors is computationally expensive since a search for an optimum motion vector is performed for each block. At step 150, the motion vectors are used to predict a motion compensated macroblock. At step 160, the motion compensated macroblock is subtracted from a current macroblock to form a residual macroblock. At step 170, the residual macroblock undergoes a transformation, the coefficients of the transformed residual macroblock are quantized, and then losslessly encoded. Since the residual macroblock carries less information than the macroblocks of the original P-frame, there is a reduction in the amount of bits that need to be transmitted to a receiving party.

Typically, a video codec will select every $N^{th}$ frame to encode as an I-frame and the rest to be encoded as P-frames. This duration between I-frames is referred to as an "intraperiod." The presence of an I-frame acts as a reference to refresh the P-frames. In other words, the presence of the I-frame ensures that the predictions made by the codec do not drift too far from the actual image. Within the designated P-frames, the video codec will also periodically select certain macroblocks as reference macroblocks, which are not predictively encoded so that the reference macroblocks may also be used to correct drifting predictions. For illustrative ease, the reference macroblocks will be referred to herein as "intra- MB" and the predictively encoded macroblocks will be referred to herein as "inter-MB."

Figure 2:
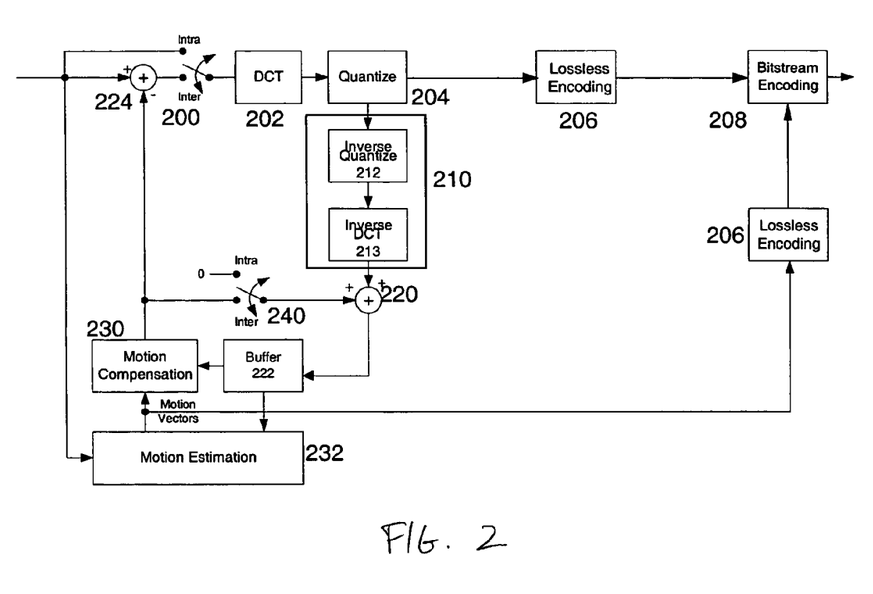
FIG. 2 is a block diagram of a conventional video encoder.

FIG. 2 is a block diagram of the encoding performed by a conventional video codec in an electronic device. The signal path through the codec depends upon whether the input image signal is an I-frame or a P-frame, or alternatively, whether a macroblock within a P-frame is a reference macroblock (intra-MB) or a predictively encoded macroblock (inter-MB). For illustrative ease, the encoding of a P-frame will be described hereafter using the terminology of intra-MBs and inter-MBs. If the input image signal is an intra-MB, then a switch 200 establishes a signal path is through the DCT block 202, the quantizer block 204, and then the lossless coding block 206. The signal leaves the video codec for further processing within the electronic device. An example of further processing is the coding at the bitstream encoding block 208, which encodes the signal in an appropriate transmission format for the transmission medium.

Although the intra-MB coding is finished at block 204, the intra-MB needs to be used as a reference macroblock for the inter-MB coding. Hence, the quantization values that exit the quantizer block 204 also enter a decoding portion 210 of the video codec. The decoding portion 210 comprises a de-quantizer block 212 and an inverse-DCT block 214. The quantization values pass through the de-quantizer block 212 and then the inverse-DCT block 214 to reconstruct the intra-MB, which is used to refresh the buffer 222 that is accessed by the motion compensation block 230 and the motion estimation block 232. The path through the DCT block 202, the quantizer block 204, and then the lossless coding block 206 is also applicable for encoding the residual macroblocks generated by the inter-MB encoding.

If the input image signal is an inter-MB, then the switch 200 establishes a new signal path, which includes the motion compensation block 230 and the motion estimation block 232. The motion estimation block 232 receives the current inter-MB and a set of stored reference macroblocks from the buffer 222 and performs a search through a plurality of motion vectors for the motion vector that best describes the motion between the current inter-MB and the reference macroblock. Note that the reference macroblock is the stored reconstructed pixels of previous or future macroblocks that were output from the decoding portion 210 of the video codec. The motion vector is then input into the motion compensation block 230.

The motion compensation block 230 receives the motion vector from the motion compensation block 230 and the reference macroblock from the buffer 222 in order to generate a new predictive macroblock from the reference macroblock, i.e., a predictive version of the current inter-MB. When inter-MB coding takes place, the reference macroblock should be updated. Hence, the switch 240 is "on," so that the predictive macroblock is added by summing element 220 to the decoded residual macroblock that is output from the decoding portion 210. The result is stored as a new reference macroblock in buffer 222.

The predictive macroblock from the motion compensation block 230 is subtracted from the current inter-MB by subtraction element 224 in order to form a residual macroblock. The residual macroblock is then processed as described above for intra-MB encoding. The quantized, transformed residual macroblock is further passed through the decoding portion 210 so that the residual macroblock may be used by the video codec to update the reference macroblock stored in the buffer 222, which in turn may be accessed by the motion compensation block 230 and motion estimation block 232 for encoding macroblocks of future or past frames. Note that predictive coding techniques may be bi-directional, in that past information may be used to predict the current frame or future information may be used to predict the current frame.

The encoding of the intra-MBs may also be generically referred to as spatial encoding or nonpredictive encoding. The encoding of the inter-MBs may also be generically referred to as predictive encoding. The problem with the conventional video codec design of FIG. 2 is that nonpredictive coding consumes too many memory resources and predictive coding consumes too many processing resources. If one of skill in the art decided that lowering the MIPS requirement is needed to perform other tasks, then increasing the number of I-frames or intra-MBs is a possible solution, which is implemented by decreasing the intra-period value N. However, this solution is flawed because the demand for memory resources would correspondingly increase. Moreover, the overall transmission rate of the video images over a communication channel would increase since more bits are needed to convey spatial information as compared to predictive information. For wireless applications, such as video streaming over cellular phones, the increased transmission bits could result in a degraded synthesized image signal if the wireless or landline communication channel cannot accommodate the increased transmission bit rate.

Conversely, if one of skill in the art decided that memory resources were limited, then one solution is to perform more predictive encoding rather than nonpredictive encoding, which is implemented by increasing the intra-period value N. However, predictive encoding requires more cycles from the processing elements which, if loaded past a maximum threshold, will drop frame processing tasks for tasks with higher priorities. Dropped frames would then degrade the quality of the synthesized image. In addition, the quality of the synthesized signal would also degrade whenever high speed activities occur within the images because the use of too many predictively encoded frames could cause a failure in the motion estimation ability of the video codec.

The embodiments that are described herein are for selectively controlling the computational complexity of the coding process for P-frames. Selectively controlling the coding process will allow a reduction in the MIPS requirements for the video coding without unduly degrading the perceived quality of the video image. Moreover, the embodiments will further reduce the amount of data traffic between the processing elements and other hardware so that a power savings may be gained.

The embodiments are for categorizing the macroblocks within a P-frame into intra-macroblocks (intra-MB), which undergo nonpredictive encoding, or inter-macroblocks (inter-MB), which undergo predictive encoding. The categorization process comprises the use of selection criteria which will reduce the MIPS requirements upon a processing element.

Figure 3:
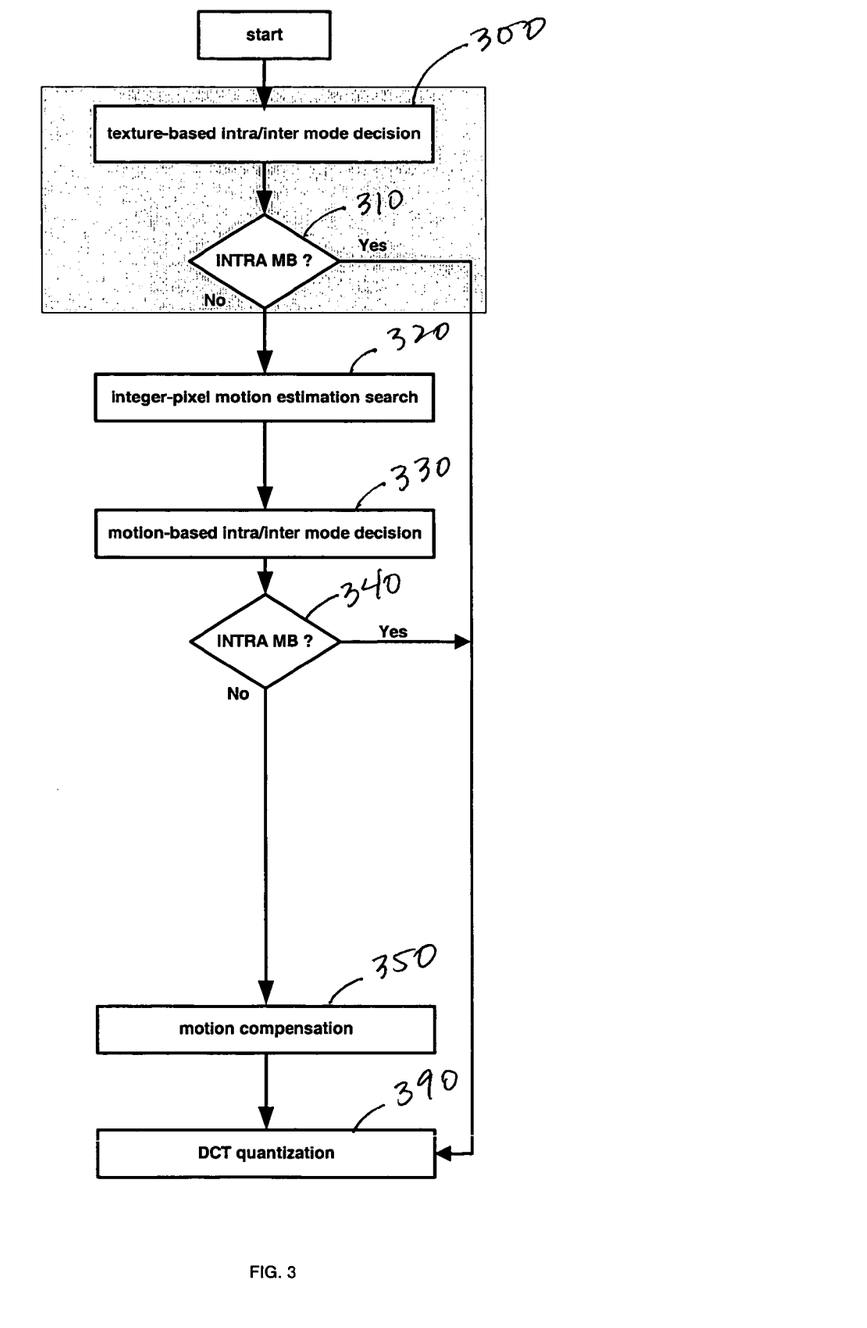
FIG. 3 is a flowchart illustrating a selective complexity control algorithm for video compression.
Figure 4:
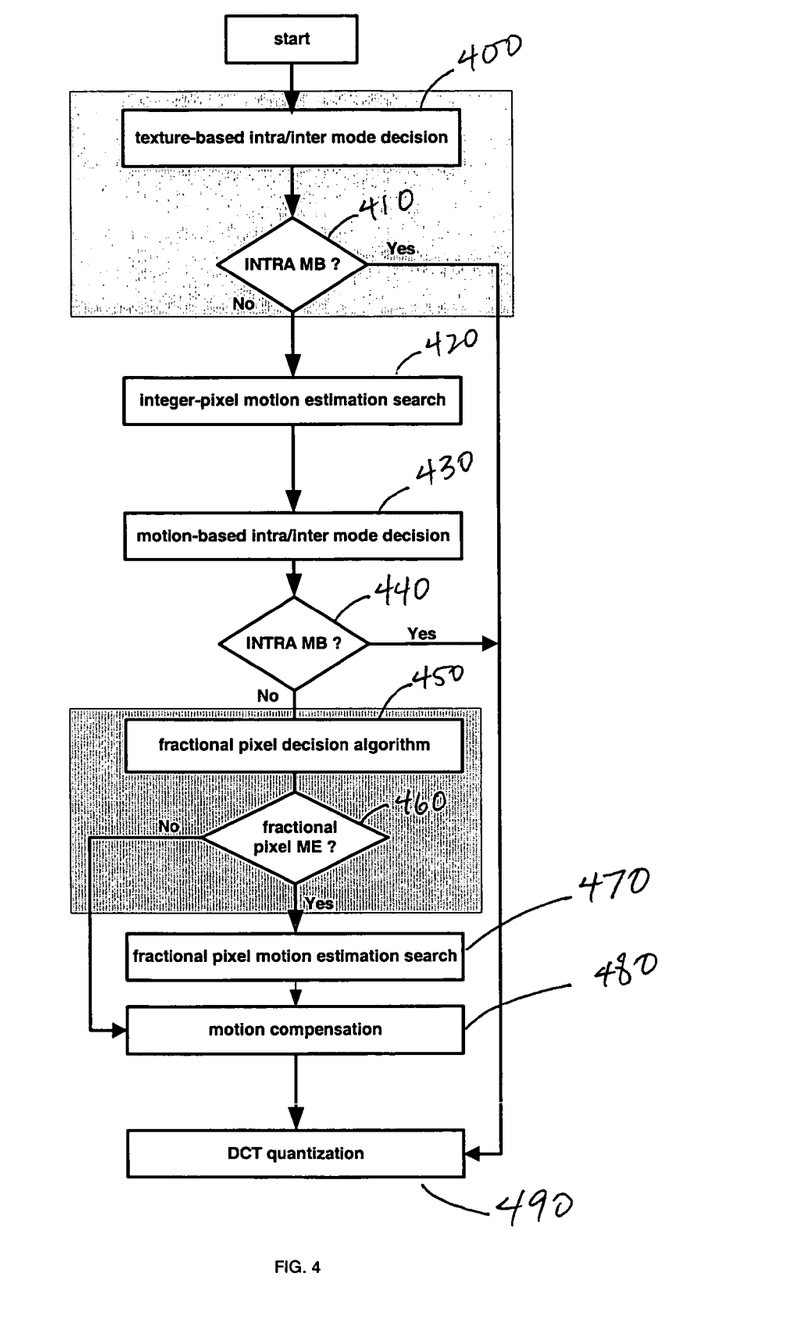
FIG. 4 is a flowchart illustrating another selective complexity control algorithm for video compression.
Figure 5:
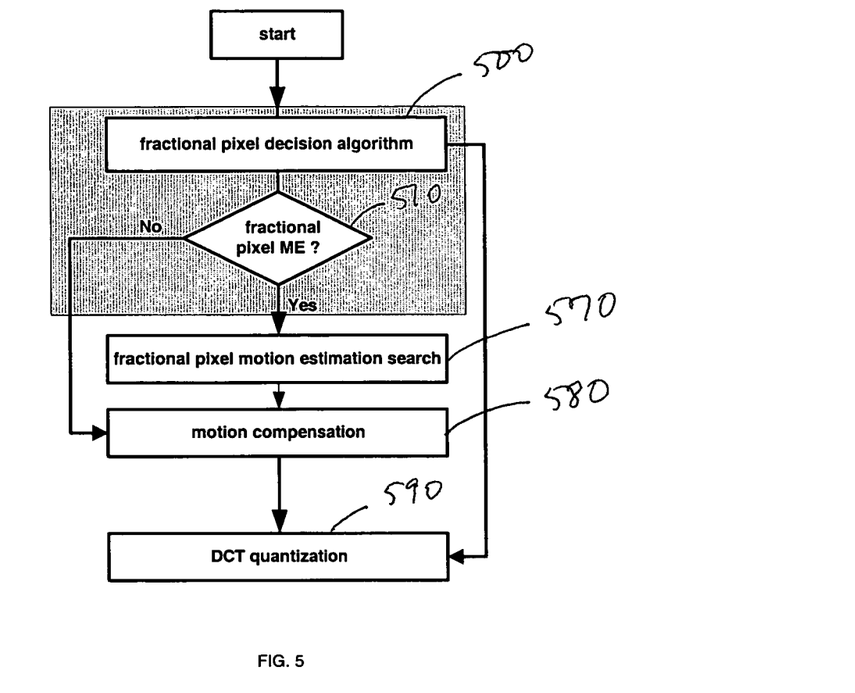
FIG. 5 is a flowchart illustrating another selective complexity control algorithm for video compression.

FIGS. 3, 4, and 5 are flowcharts illustrating embodiments for selective complexity control of the P-frame encoding. Hardware, such as a digital signal processor or other processing element and memory elements may be configured to execute instructions for performing the method steps in FIGS. 3, 4, or 5.

In FIG. 3, a selective complexity control process is illustrated which is directed towards using texture information and motion information to determine whether a macroblock is encoded as an intra-MB or an inter-MB. At step 300, an estimate of the texture bits is performed for each macro-block within the P-frame. Texture bits are those bits in a frame with image information, which are required to encode the pixel values of the image. At step 310, a determination is made whether a macroblock is an intra-MB or an inter-MB based on the texture bit estimate. In one aspect of the embodiment, those macroblocks with the least amount of texture information, i.e., least coding bits requirement, are designated as intra-MBs.

If the macroblock is an intra-MB, then the program flow proceeds to step 390, whereupon the intra-MB is encoded as a nonpredictive information frame. Note that a selective bypass of the motion estimation and compensation computations has occurred.

If the macroblock is determined to be an inter-MB at step 310, then the program flow proceeds to step 320. At step 320, an integer-pixel motion estimation search is performed. At step 330, motion information is determined which measure the efficiency of the prediction process. For example, the efficiency of the current prediction may be tested using the differences between pixels of a past macroblock and a future macroblock. Hence, the pixel differences may be used as a quality metric to gauge the efficiency of the temporal prediction. Other quality metrics may be used without affecting the scope of the embodiments.

At step 340, another determination is made as to whether the macroblock is an intra-MB or an inter-MB, wherein the determination uses the motion information derived at step 320. If the macroblock is determined to be an intra-MB according to the motion-based criteria, then the program flow proceeds to step 390, whereupon the intra-MB is encoded as an I-frame. In other words, nonpredictive encoding is used to encode the intra-MB.

If the macroblock is still categorized as an inter-MB under the motion-based determination at step 340, then the program flow proceeds to step 350. At step 350, motion compensation is performed. At step 360, the residual image signal is transformed, quantized, and losslessly encoded.

In one aspect of the embodiment described above, the determination that a macroblock is an intra-MB or an inter-MB may be performed by using variances to estimate the texture bits. In this aspect, the variance of a macroblock is calculated. The calculated variance may then be compared to an average variance of a previous frame. Note that a large variance indicates more texture in an image. If the variance of the current macroblock is less than a scaled average variance of the previous frame, then the macroblock should be designated as an intra-MB. Hence, if $(A<\alpha B)$, wherein A is the variance of the current macroblock, $\alpha$ is an empirical threshold used as a scaling factor, and B is the average variance of the previous frame, or alternatively, a weighted average of a plurality of previous frames, then the embodiment that is described in FIG. 3 may be turned into a selective and scalable complexity control algorithm because $\alpha$ may be adjusted dynamically or remain static. In one embodiment, a processing element may be designed to implement a selective and scalable complexity control algorithm, wherein the threshold values of the algorithm are responsive to given target goals. As a result of the configurable threshold values, the number of intra-MBs and/or inter-MBs that is needed to accomplish a target goal may be scaled.

In one aspect, the complexity control algorithm may be implemented to accommodate video streams with differing image sizes and/or frame rates. In yet another aspect, the complexity control algorithm may be implemented to accommodate variable transmission channels that are prone to channel errors. In yet another aspect, the complexity control algorithm may be implemented to accommodate a user-defined quality measure. In yet another aspect, the complexity control algorithm may be implemented to accommodate a lack of hardware resources. As indicated herein, the embodiments may be used to accommodate many different needs that may originate from different portions of the electronic device that houses the video codec. Configuration signals may originate at any portion of the electronic device or alternatively, the configuration signals may originate from a network that is accessed by the electronic device.

FIG. 4 is flowchart illustrating another embodiment for selective complexity control of the P-frame encoding, wherein a determination is made as to whether to encode a macroblock using additional processing resources. At step 400, an estimate of the texture bits is performed for each macro-block within the P-frame. At step 410, a determination is made whether a macroblock is an intra-MB or an inter-MB based on the texture bit estimate. In one aspect of the embodiment, those macroblocks with the least amount of texture information, i.e., least coding bits requirement, should be designated as intra-MBs.

If the macroblock is an intra-MB, then the program flow proceeds to step 490, whereupon the intra-MB is encoded using nonpredictive encoding. Note that a selective bypass of the motion estimation and compensation computations has occurred.

If the macroblock is an inter-MB, then the program flow proceeds to step 420. At step 420, an integer-pixel motion estimation search is performed. At step 430, motion information is determined. At step 440, another determination is made as to whether the macroblock is an intra-NB or an inter-MB, using the motion information derived at step 430. If the macroblock is an intra-MB, then the program flow proceeds to step 490, whereupon the intra-MB is encoded using nonpredictive encoding.

If the macroblock is still categorized as an inter-MB under the motion-based determination, then the program flow proceeds to step 450. At step 450, a quality measure is taken. In one aspect of the embodiment, the quality measure is a sum of absolute distance (SAD) values, wherein the absolute distance value is the absolute difference between a current MB and a previous MB. At step 460, a determination is made whether to selectively bypass a fractional pixel motion estimation step. Fractional pixel motion estimation is a refinement of integer pixel motion estimation. A fractional pixel value may be determined by interpolation between two integer valued pixels. Hence, a half-pixel, quarter-pixel, eighth-pixel, or any fractional pixel value may possibly be calculated.

If the decision at step 460 is that the fractional-pixel motion search is not needed, then the program flow proceeds to step 480. If the decision is that the fractional-pixel motion search is needed, then the program flow proceeds to step 470.

At step 470, a fractional pixel motion estimation search is performed. At step 480, motion compensation is performed. At step 490, the residual image signal is transformed, quantized, and losslessly encoded.

In the embodiment described above, the determination that the fractional pixel motion estimation search should or should not be selectively bypassed is based upon a quality measure. In one aspect of this embodiment, the quality measure is a sum of absolute distance (SAD) value. The SAD value may be compared to an average minimum SAD value from a previous frame. If the current SAD value is less than a scaled, average minimum SAD value, then the fractional-pixel motion estimation search may be bypassed without loss of quality. Hence, if $(C<\lambda D)$, wherein C is the current SAD value, $\lambda$ is an empirical threshold used as a scaling factor, and D is the average minimum SAD value of the previous frame, or alternatively, a weighted average of a plurality of previous and/or future frames, then the embodiment that is described in FIG. 4 may be turned into a selective and scalable complexity control algorithm because λ may be adjusted dynamically or remain static.

FIG. 5 is another flowchart which illustrates another embodiment for the selective and scalable complexity control of the encoding for the P-frame, wherein a determination is made as to whether different various motion estimation schemes should be implemented together. At step 500, a quality metric is determined, wherein the quality metric measures the efficiency of temporal prediction. In one aspect, the quality metric is based upon a SAD value. The SAD value may be compared to an average minimum SAD value from a previous and/or future frame. If the current SAD value is less than a scaled, average minimum SAD value, then the fractional-pixel motion estimation search may be bypassed without loss of quality. Hence, if (C<λD), wherein C is the current SAD value, λ is an empirical threshold used as a scaling factor, and D is the average minimum SAD value of the previous and/or frame, then the embodiment that is described in FIG. 5 may be turned into a selective and scalable complexity control algorithm because λ may be adjusted dynamically or remain static.

At step 510, a determination is made whether to selectively bypass a fractional pixel motion estimation step based upon the quality metric determined at step 500. If the decision at step 510 is that the fractional pixel motion search is not needed, then the program flow proceeds to step 580. If the decision is that the fractional pixel motion search is needed, then the program flow proceeds to step 570.

At step 570, a fractional pixel motion estimation search is performed. At step 580, motion compensation is performed. At step 590, the residual image signal is transformed, quantized, and losslessly encoded.

Note that the aforementioned embodiments for selective and scalable complexity control algorithms permit a user or system to set a guaranteed percentage of each P-frame to be designated as either an intra-MB or an inter-MB. In other words, the embodiments may be used to selectively perform either nonpredictive or predictive encoding within a P-frame, which may correspond to a substantial MIPS savings for the processing elements within the video codec. The embodiments permit the MIPS savings without sacrificing perceptual quality since the selection of nonpredictive or predictive encoding is performed using image information, rather than an arbitrary designation. Moreover, since video streams are inherently a variable bit rate source, the capability to fix a percentage of macroblocks within each predictive frame as nonpredictive in character allows a degree of control when attempting to prepare the video stream for transmission over a variable rate transmission media.

Figure 6:
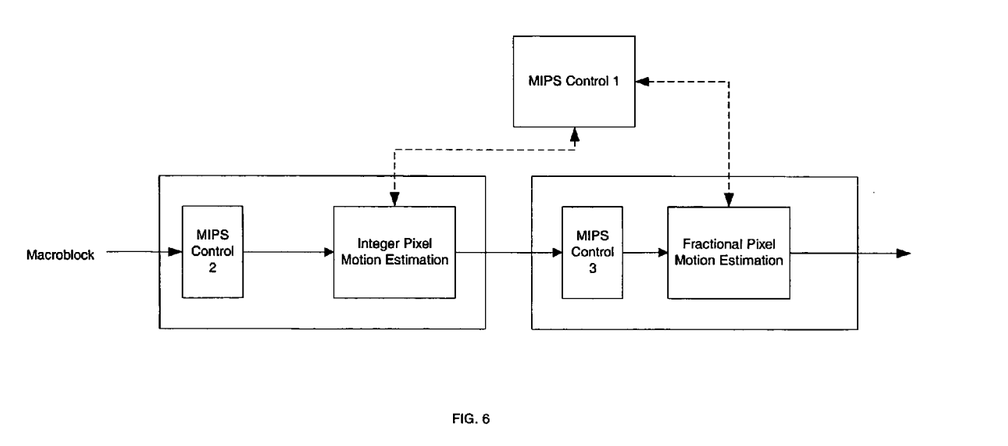
FIG. 6 is a block diagram illustrating a video encoder with complexity control elements.

FIG. 6 is a functional block diagram of a video codec configured to use at least one complexity control element to selectively reduce the MIPS requirements of the video encoder.

The complexity control elements in FIG. 6 are referred to MIPS Control 1, MIPS Control 2, and MIPS Control 3. The complexity control elements are communicatively coupled to functional portions of a video codec and may comprise either specialized or general processing elements. MIPS Control 2 may be configured to implement the embodiment described in FIG. 3. MIPS Control 3 may be configured to implement the embodiment described in FIG. 4. MIPS Control 1 may be configured to implement the embodiment described in FIG. 5. MIPS Control 1, 2, or 3 designates macroblocks of a P-frame as intra-MB or inter-MB in accordance with the principles of the complexity control algorithms described herein. Note that the presence of MIPS Control 1 may be redundant if both MIPS Control 2 and 3 are present, and vice versa. The MIPS Control 1 may be implemented to master the usage of MIPS Control 2 and/or 3. The MIPS Control 1 may be implemented within the video codec itself or remain apart from the video codec. Moreover, MIPS Control 1 may be configured to be responsive to configuration signals from other portions of the electronic device.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for encoding video data, the method comprising:
   determining a variance value for a current block of a first frame of video data;
   determining an average variance value for a second frame of video data;
   determining, based on a first scaling factor and the average variance value for the second frame of video data, a scaled average variance value;
   comparing the variance value of the current block of video data to the scaled average variance value for the second frame of video data;
   in response to determining that the variance value of the current block of video data is less than the scaled average variance value for the second frame of video data, intra coding the current block of video data;
   in response to determining that the variance value of the current block of video data is not less than the scaled average variance value for the second frame of video data, performing motion estimation to determine motion information associated with the current block of video data;
   determining, based on the motion information associated with the current block of video data, whether to inter code the current block of video data;
   in response to determining to inter code the current block of video data, inter coding the current block of video data by at least:
      determining a sum of absolute distance (SAD) value for the current block of video data:
      determining an average minimum SAD value for a third frame of video data;
      determining, based on a second scaling factor and the average minimum SAD value for the third frame of video data, a scaled average minimum SAD value;
      comparing the SAD value for the current block of video data of the current frame to the scaled average minimum SAD value for the third frame of video data; and
      in response to determining that the SAD value for the current block of video data is not less than the scaled average minimum SAD value for the third frame of video data, performing a fractional pixel motion estimation search; and
   in response to determining not to inter code the current block of video, intra coding the current block of video data.

2. The method of claim 1, wherein the first scaling factor is adjustable.

3. The method of claim 1, wherein the first scaling factor is static.

4. The method of claim 1, wherein the first scaling factor is determined based on one or more of:
   an image size;
   a frame rate;
   a user command;
   a transmission channel; and
   available hardware resources.

5. The method of claim 1, further comprising:
   determining an average variance value for a plurality of frames,
   wherein determining the scaled average variance value comprises determining the scaled average variance value based on the average variance value for the plurality of frames.

6. The method of claim 5, wherein determining the average variance value for the plurality of frames comprises determining a weighted average variance value for the plurality of frames.

7. The method of claim 1, wherein the second scaling factor is adjustable.

8. The method of claim 1, wherein the second scaling factor is static.

9. The method of claim 1, wherein the second scaling factor is determined based on one or more of:
   an image size;
   a frame rate;
   a user command;
   a transmission channel; and
   available hardware resources.

10. The method of claim 1, further comprising:
    determining an average minimum SAD value for a plurality of frames,
    wherein determining the scaled average minimum SAD value comprises determining the scaled average minimum SAD value based on the average minimum SAD value for the plurality of frames.

11. The method of claim 10, wherein determining the average minimum SAD value for the plurality of frames comprises determining a weighted average minimum SAD value for the plurality of frames.

12. The method of claim 1, further comprising:
    receiving a configuration signal; and
    determining, based on the configuration signal, the first scaling factor.

13. The method of claim 12, wherein the configuration signal indicates one or more of:
    an image size;
    a frame rate;
    a user command;
    a transmission channel; and
    available hardware resources.

14. The method of claim 12, wherein a plurality of blocks of video data includes the current block of video data, wherein the first scaling factor is dynamically readjusted when determining whether to intra code the plurality of blocks of video data.

15. The method of claim 12, further comprising:
    determining, based on the configuration signal, the second scaling factor.

16. A device for encoding video data comprising:
    a memory configured to store video data; and
    a video encoder configured to:
    determine a variance value for a current block of a first frame of video data;
    determine an average variance value for a second frame of video data;
    determine, based on a first scaling factor and the average variance value for the second frame of video data, a scaled average variance value;
    compare the variance value of the current block of video data to the scaled average variance value for the second frame of video data;
    in response to determining that the variance value of the current block of video data is less than the scaled average variance value for the second frame of video data, intra code the current block of video data;
    in response to determining that the variance value of the current block of video data is not less than the scaled average variance value for the second frame of video data, perform motion estimation to determine motion information associated with the current block of video data;

determine, based on the motion information associated with the current block of video data, whether to inter code the current block of video data;

in response to determining to inter code the current block of video data, inter code the current block of video data, wherein, to inter code the current block of video data, the video encoder is configured to:

determine a sum of absolute distance (SAD) value for the current block of video data;

determine an average minimum SAD value for a third frame of video data;

determine, based on a second scaling factor and the average minimum SAD value for the third frame of video data, a scaled average minimum SAD value;

compare the SAD value for the current block of video data of the current frame to the scaled average minimum SAD value for the third frame of video data; and in response to determining that the SAD value for the current block of video data is not less than the scaled average minimum SAD value for the third frame of video data, perform a fractional pixel motion estimation search; and in response to determining not to inter code the current block of video, intra code the current block of video data.

17. The device of claim 16, wherein the first scaling factor is adjustable.

18. The device of claim 16, wherein the first scaling factor is static.

19. The device of claim 16, wherein the first scaling factor is determined based on one or more of:
an image size;
a frame rate;
a user command;
a transmission channel; and
available hardware resources.

20. The device of claim 16, wherein the video encoder is further configured to:
determine an average variance value for a plurality of frames,
wherein the video encoder is configured to determine the scaled average variance value by determining the scaled average variance value based on the average variance value for the plurality of frames.

21. The device of claim 20, wherein the video encoder is configured to determine the average variance value for the plurality of frames by determining a weighted average variance value for the plurality of frames.

22. The device of claim 16, wherein the second scaling factor is adjustable.

23. The device of claim 16, wherein the second scaling factor is static.

24. The device of claim 16, wherein the second scaling factor is determined based on one or more of:
an image size;
a frame rate;
a user command;
a transmission channel; and
available hardware resources.

25. The device of claim 16, wherein the video encoder is further configured to:
determine an average minimum SAD value for a plurality of frames,
wherein the video encoder is configured to determine the scaled average minimum SAD value by determining the scaled average minimum SAD value based on the average minimum SAD value for the plurality of frames.

26. The device of claim 16, wherein the video encoder is configured to determine the average minimum SAD value for the plurality of frames by determining a weighted average minimum SAD value for the plurality of frames.

27. The device of claim 16, wherein the video coder is further configured to:
receive a configuration signal; and
determine, based on the configuration signal, the first scaling factor.

28. The device of claim 27, wherein the configuration signal indicates one or more of:
an image size;
a frame rate;
a user command;
a transmission channel; and
available hardware resources.

29. The device of claim 27, wherein a plurality of blocks of video data includes the current block of video data, wherein the first scaling factor is dynamically readjusted when determining whether to intra code the plurality of blocks of video data.

30. The device of claim 27, wherein the video coder is further configured to:
determine, based on the configuration signal, the second scaling factor.

31. A device for encoding video data, the device comprising:
means for determining a variance value for a current block of a first frame of video data;
means for determining an average variance value for a second frame of video data;
means for determining, based on a first scaling factor and the average variance value for the second frame of video data, a scaled average variance value;
means for comparing the variance value of the current block of video data to the scaled average variance value for the second frame of video data;
means for intra coding the current block of video data in response to determining that the variance value of the current block of video data is less than the scaled average variance value for the second frame of video data;
means for performing motion estimation to determine motion information associated with the current block of video data in response to determining that the variance value of the current block of video data is not less than the scaled average variance value for the second frame of video data;
means for determining, based on the motion information associated with the current block of video data, whether to inter code the current block of video data;
means for inter coding, in response to determining to inter code the current block of video data, the current block of video data wherein the means for inter coding the current block of video data comprise:
means for determining a sum of absolute distance (SAD) value for the current block of video data;
means for determining an average minimum SAD value for a third frame of video data;
means for determining, based on a second scaling factor and the average minimum SAD value for the third frame of video data, a scaled average minimum SAD value;

means for comparing the SAD value for the current block of video data of the current frame to the scaled average minimum SAD value for the third frame of video data; and means for performing, in response to determining that the SAD value for the current block of video data is not less than the scaled average minimum SAD value for the third frame of video data, a fractional pixel motion estimation search; and means for intra coding the current block of video data in response to determining not to inter code the current block of video.

32. The device of claim 31, wherein the first scaling factor is adjustable.

33. The device of claim 31, wherein the first scaling factor is static.

34. The device of claim 31, wherein the first scaling factor is determined based on one or more of:
an image size;
a frame rate;
a user command;
a transmission channel; and
available hardware resources.

35. The device of claim 31, further comprising:
means for determining an average variance value for a plurality of frames,
wherein the means for determining the scaled average variance value comprise means for determining the scaled average variance value based on the average variance value for the plurality of frames.

36. The device of claim 35, wherein the means for determining the average variance value for the plurality of frames comprise means for determining a weighted average variance value for the plurality of frames.

37. The device of claim 31, wherein the second scaling factor is adjustable.

38. The device of claim 31, wherein the second scaling factor is static.

39. The device of claim 31, wherein the second scaling factor is determined based on one or more of:
an image size;
a frame rate;
a user command;
a transmission channel; and
available hardware resources.

40. The device of claim 31, further comprising:
means for determining an average minimum SAD value for a plurality of frames,
wherein the means for determining the scaled average minimum SAD value comprise means for determining the scaled average minimum SAD value based on the average minimum SAD value for the plurality of frames.

41. The device of claim 40, wherein the means for determining the average minimum SAD value for the plurality of frames comprise means for determining a weighted average minimum SAD value for the plurality of frames.

42. The device of claim 31, further comprising:
means for receiving a configuration signal; and
means for determining, based on the configuration signal, the first scaling factor.

43. The device of claim 42, wherein the configuration signal indicates one or more of:
an image size;
a frame rate;
a user command;
a transmission channel; and
available hardware resources.

44. The device of claim 42, wherein a plurality of blocks of video data includes the current block of video data, wherein the first scaling factor is dynamically readjusted when determining whether to intra code the plurality of blocks of video data.

45. The device of claim 42, further comprising:
means for determining, based on the configuration signal, the second scaling factor.

46. A non-transitory computer-readable storage medium storing instructions that, when executed, cause one or more processors to encode video data, wherein the instructions that cause the one or more processors to encode the video data comprise instructions that cause the one or more processors to:
determine a variance value for a current block of a first frame of video data;
determine an average variance value for a second frame of video data;
determine, based on a first scaling factor and the average variance value for the second frame of video data, a scaled average variance value;
compare the variance value of the current block of video data to the scaled average variance value for the second frame of video data;
in response to determining that the variance value of the current block of video data is less than the scaled average variance value for the second frame of video data, intra code the current block of video data;
in response to determining that the variance value of the current block of video data is not less than the scaled average variance value for the second frame of video data, perform motion estimation to determine motion information associated with the current block of video data;
determine, based on the motion information associated with the current block of video data, whether to inter code the current block of video data;
in response to determining to inter code the current block of video data, inter code the current block of video data, wherein the instructions that cause the one or more processors to inter code the current block of video data comprise instructions that cause the one or more processors to:
determine a sum of absolute distance (SAD) value for the current block of video data;
determine an average minimum SAD value for a third frame of video data;
determine, based on a second scaling factor and the average minimum SAD value for the third frame of video data, a scaled average minimum SAD value;
compare the SAD value for the current block of video data of the current frame to the scaled average minimum SAD value for the third frame of video data; and
in response to determining that the SAD value for the current block of video data is not less than the scaled average minimum SAD value for the third frame of video data, perform a fractional pixel motion estimation search; and
in response to determining not to inter code the current block of video, intra code the current block of video data.

47. The non-transitory computer-readable storage medium of claim 46, wherein the first scaling factor is adjustable.

48. The non-transitory computer-readable storage medium of claim 46, wherein the first scaling factor is static.

49. The non-transitory computer-readable storage medium of claim 46, wherein the first scaling factor is determined based on one or more of:

an image size;
a frame rate;
a user command;
a transmission channel; and
available hardware resources.

50. The non-transitory computer-readable storage medium of claim 46, further comprising instructions that cause the one or more processors to:
   determine an average variance value for a plurality of frames,
   wherein the instructions that cause the one or more processors to determine the scaled average variance value comprise instructions that cause the one or more processors to determine the scaled average variance value based on the average variance value for the plurality of frames.

51. The non-transitory computer-readable storage medium of claim 50, wherein the instructions that cause the one or more processors to determine the average variance value for the plurality of frames comprise instructions that cause the one or more processors to determine a weighted average variance value for the plurality of frames.

52. The non-transitory computer-readable storage medium of claim 46, wherein the second scaling factor is adjustable.

53. The non-transitory computer-readable storage medium of claim 46, wherein the second scaling factor is static.

54. The non-transitory computer-readable storage medium of claim 46, wherein the second scaling factor is determined based on one or more of:
   an image size;
   a frame rate;
   a user command;
   a transmission channel; and
   available hardware resources.

55. The non-transitory computer-readable storage medium of claim 46, further comprising instructions that cause the one or more processors to:
   determine an average minimum SAD value for a plurality of frames,
   wherein the instructions that cause the one or more processors to determine the scaled average minimum SAD value comprise instructions that cause the one or more processors to determine the scaled average minimum SAD value based on the average minimum SAD value for the plurality of frames.

56. The non-transitory computer-readable storage medium of claim 54, wherein the instructions that cause the one or more processors to determine the average minimum SAD value for the plurality of frames comprise instructions that cause the one or more processors to determine a weighted average minimum SAD value for the plurality of frames.

57. The non-transitory computer-readable storage medium of claim 46, further comprising instructions that cause the one or more processors to:
   receive a configuration signal; and
   determine, based on the configuration signal, the first scaling factor.

58. The non-transitory computer-readable storage medium of claim 56, wherein the configuration signal indicates one or more of:
   an image size;
   a frame rate;
   a user command;
   a transmission channel; and
   available hardware resources.

59. The non-transitory computer-readable storage medium of claim 56, wherein a plurality of blocks of video data includes the current block of video data, wherein the first scaling factor is dynamically readjusted when determining whether to intra code the plurality of blocks of video data.

60. The non-transitory computer-readable storage medium of claim 56, further comprising instructions that cause the one or more processors to:
   determine, based on the configuration signal, the second scaling factor.

* * * * *